United States Patent
He et al.

(10) Patent No.: US 11,062,104 B2
(45) Date of Patent: Jul. 13, 2021

(54) OBJECT RECOGNITION SYSTEM WITH INVISIBLE OR NEARLY INVISIBLE LIGHTING

(71) Applicant: ZEBRA TECHNOLOGIES CORPORATION, Lincolnshire, IL (US)

(72) Inventors: Duanfeng He, South Setauket, NY (US); Miroslav Trajkovic, Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/505,294

(22) Filed: Jul. 8, 2019

(65) Prior Publication Data

US 2021/0012070 A1    Jan. 14, 2021

(51) Int. Cl.
| | | |
|---|---|---|
| G06K 7/10 | (2006.01) | |
| G06K 9/00 | (2006.01) | |
| G06K 19/06 | (2006.01) | |
| G06T 7/194 | (2017.01) | |
| G06T 7/20 | (2017.01) | |

(52) U.S. Cl.
CPC ......... *G06K 7/1096* (2013.01); *G06K 7/1097* (2013.01); *G06K 7/1098* (2013.01); *G06K 7/10198* (2013.01); *G06K 9/00375* (2013.01); *G06K 19/0614* (2013.01); *G06K 19/06131* (2013.01); *G06T 7/194* (2017.01); *G06T 7/20* (2013.01)

(58) Field of Classification Search
CPC .. G06K 7/1096; G06K 7/1097; G06K 7/0614; G06K 7/1098; G06K 9/6262; G06K 9/62; G06K 19/06131; G06K 19/0614; G06N 20/00
See application file for complete search history.

(56) References Cited

U.S. PATENT DOCUMENTS

| | | | | |
|---|---|---|---|---|
| 6,079,862 A | * | 6/2000 | Kawashima | G01S 3/7864 |
| | | | | 382/103 |
| 6,618,512 B1 | * | 9/2003 | Yamaguchi | G06T 7/0004 |
| | | | | 382/319 |
| 6,996,253 B2 | * | 2/2006 | Gloger | B60R 1/00 |
| | | | | 348/E5.09 |
| 7,823,787 B2 | * | 11/2010 | He | G06K 7/10762 |
| | | | | 235/462.42 |
| 10,074,003 B2 | * | 9/2018 | Xu | H04N 5/23219 |
| 10,133,857 B2 | * | 11/2018 | Arunachalam | H04L 63/0861 |
| 10,262,176 B1 | * | 4/2019 | Powell | G06K 19/06028 |
| 10,380,150 B2 | * | 8/2019 | Huang | G06F 40/20 |

(Continued)

*Primary Examiner* — Daniel I Walsh
(74) *Attorney, Agent, or Firm* — Yuri Astvatsaturov

(57) ABSTRACT

A barcode reader is provided. The barcode reader includes a first image acquisition assembly having a first imager assembly configured to capture infrared (IR) light and an IR illumination assembly configured to emit IR light over at least a portion of a first field of view (FOV) of the first imager assembly so as to illuminate targets within the first FOV. The barcode reader further includes a second image acquisition assembly having a second imager assembly configured to capture visible light and a visible-light illumination assembly configured to emit visible light over at least a portion of a second FOV of the second imager assembly so as to illuminate targets within the second FOV.

18 Claims, 5 Drawing Sheets

(56) References Cited

U.S. PATENT DOCUMENTS

| | | | | |
|---|---|---|---|---|
| 10,515,248 B1* | 12/2019 | Cornell | | G06F 21/572 |
| 10,685,198 B1* | 6/2020 | Barkan | | G06K 7/10732 |
| 10,769,399 B2* | 9/2020 | Pang | | G06K 7/1413 |
| 2002/0051562 A1* | 5/2002 | Sheppard | | G06K 9/186 |
| | | | | 382/137 |
| 2003/0059103 A1* | 3/2003 | Shiomi | | G01N 21/956 |
| | | | | 382/144 |
| 2005/0011956 A1* | 1/2005 | Carlson | | G06K 7/10851 |
| | | | | 235/462.42 |
| 2007/0152057 A1* | 7/2007 | Cato | | G05D 1/0242 |
| | | | | 235/462.01 |
| 2008/0073487 A1* | 3/2008 | Brock | | H04N 5/2254 |
| | | | | 250/208.1 |
| 2009/0134221 A1* | 5/2009 | Zhu | | A47F 9/048 |
| | | | | 235/383 |
| 2010/0139989 A1* | 6/2010 | Atwater | | G01G 23/3735 |
| | | | | 177/245 |
| 2010/0200658 A1* | 8/2010 | Olmstead | | G06K 7/10732 |
| | | | | 235/455 |
| 2011/0108628 A1* | 5/2011 | Brock | | G06K 7/12 |
| | | | | 235/462.42 |
| 2011/0294543 A1* | 12/2011 | Lapstun | | H04N 1/00129 |
| | | | | 455/556.1 |
| 2012/0145788 A1* | 6/2012 | Horn | | G06K 7/10574 |
| | | | | 235/462.07 |
| 2012/0199644 A1* | 8/2012 | Kearney | | G06K 7/10762 |
| | | | | 235/375 |
| 2012/0248188 A1* | 10/2012 | Kearney | | G06K 7/10722 |
| | | | | 235/440 |
| 2013/0126618 A1* | 5/2013 | Gao | | H04N 9/045 |
| | | | | 235/469 |
| 2013/0127993 A1* | 5/2013 | Wang | | H04N 13/271 |
| | | | | 348/46 |
| 2013/0292622 A1* | 11/2013 | Waite | | E04F 11/1804 |
| | | | | 256/65.01 |
| 2013/0299581 A1* | 11/2013 | Handshaw | | G06K 7/12 |
| | | | | 235/440 |
| 2014/0104416 A1* | 4/2014 | Giordano | | G01N 9/02 |
| | | | | 348/135 |
| 2015/0028103 A1* | 1/2015 | Jiang | | G06K 7/10564 |
| | | | | 235/455 |
| 2017/0154254 A1* | 6/2017 | Crooks | | H04N 5/2256 |
| 2019/0286889 A1* | 9/2019 | DeCovnick | | G06K 9/00302 |
| 2019/0377972 A1* | 12/2019 | Liu | | G06K 9/6254 |
| 2020/0151692 A1* | 5/2020 | Gao | | G06K 9/00671 |
| 2020/0192608 A1* | 6/2020 | Pang | | G06K 7/1413 |
| 2020/0193112 A1* | 6/2020 | Pang | | G06K 7/1439 |
| 2020/0193281 A1* | 6/2020 | Wilfred | | G06K 7/1482 |
| 2020/0202091 A1* | 6/2020 | Wilfred | | G06Q 20/322 |
| 2021/0012070 A1* | 1/2021 | He | | G06T 7/194 |

\* cited by examiner

OBJECT RECOGNITION SYSTEM WITH INVISIBLE OR NEARLY INVISIBLE LIGHTING

BACKGROUND OF THE INVENTION

In a retail setting, it may be desirable to capture images of products whose barcodes are being read by a barcode reader, e.g., to ensure that the product scanned matches the barcode attached to the product. However, object recognition systems may have difficulty identifying a product against the background of a retail environment. Accordingly, there exists a need for a way to improve upon object recognition difficulties in distinguishing scanned objects from backgrounds in captured images.

SUMMARY

In an embodiment, the present invention is a bi-optic barcode reader that includes: a housing having a platter and an upright tower, the platter having a generally horizontal window and the upright tower having a generally upright window; a first image acquisition assembly positioned at least partially within the housing, the first image acquisition assembly having an infrared (IR) illumination assembly and a first imager assembly, the first imager assembly having a first field of view (FOV) and being configured to capture IR light, the first FOV being directed out of the housing through the generally upright window, the IR illumination assembly being configured to emit IR light over at least a portion of the first FOV so as to illuminate targets within the first FOV; and a second image acquisition assembly positioned at least partially within the housing, the second image acquisition assembly having a visible-light illumination assembly and a second imager assembly, the second imager assembly having a second FOV and being configured to capture visible light, the second FOV being directed out of the housing through the generally horizontal window, the visible-light illumination assembly being configured to emit visible light over at least a portion of the second FOV so as to illuminate targets within the second FOV.

In another embodiment, the present invention is an object recognition system that includes: a bi-optic barcode reader comprising: a housing having a platter and an upright tower, the platter having a generally horizontal window and the upright tower having a generally upright window; a first image acquisition assembly positioned at least partially within the housing, the first image acquisition assembly having an IR illumination assembly and a first imager assembly, the first imager assembly having a first FOV and being configured to capture IR light, the first FOV being directed out of the housing through the generally upright window, the IR illumination assembly being configured to emit IR light over at least a portion of the first FOV so as to illuminate targets within the first FOV; and a second image acquisition assembly positioned at least partially within the housing, the second image acquisition assembly having a visible-light illumination assembly and a second imager assembly, the second imager assembly having a second FOV and being configured to capture visible light, the second FOV being directed out of the housing through the generally horizontal window, the visible-light illumination assembly being configured to emit visible light over at least a portion of the second FOV so as to illuminate targets within the second FOV; and a server communicatively coupled to the bi-optic barcode reader, the server configured to: train a machine-learning object recognition model by analyzing first image data received from the first image acquisition assembly; and generate, via the machine-learning object recognition model, object recognition data in response to receiving second image data from the first image acquisition assembly.

In still another embodiment, the present invention is a method including: capturing, by a first imager assembly of a first image acquisition assembly positioned at least partially within a housing having a platter and an upright tower, the platter having a generally horizontal window and the upright tower having a generally upright window, images of targets within a first FOV illuminated by IR light emitted by an IR illumination assembly of the first image acquisition assembly, wherein the first FOV is directed out of the housing through the generally upright window; and capturing, by a second imager assembly of a second image acquisition assembly positioned at least partially within the housing, images of targets within a second FOV illuminated by visible light emitted by a visible-light illumination assembly of the second image acquisition assembly, wherein the second FOV is directed out of the housing through the generally horizontal window.

In another embodiment, the present invention is a barcode reader that includes: a housing having a window; a first image acquisition assembly positioned at least partially within the housing, the first image acquisition assembly having an IR illumination assembly and a first imager assembly, the first imager assembly having a first FOV and being configured to capture IR light, the first FOV being directed out of the housing through the window, the IR illumination assembly being configured to emit IR light over at least a portion of the first FOV so as to illuminate targets within the first FOV; and a second image acquisition assembly positioned at least partially within the housing, the second image acquisition assembly having a visible-light illumination assembly and a second imager assembly, the second imager assembly having a second FOV and being configured to capture visible light, the second FOV being directed out of the housing through the window, the visible-light illumination assembly being configured to emit visible light over at least a portion of the second FOV so as to illuminate targets within the second FOV.

In still another embodiment, the present invention is a method including: capturing, by a first imager assembly of a first image acquisition assembly positioned at least partially within a housing having a window, images of targets within a first FOV illuminated by IR light emitted by an IR illumination assembly of the first image acquisition assembly, wherein the first FOV is directed out of the housing through the window; and capturing, by a second imager assembly of a second image acquisition assembly positioned at least partially within the housing, images of targets within a second FOV illuminated by visible light emitted by a visible-light illumination assembly of the second image acquisition assembly, wherein the second FOV is directed out of the housing through the window.

In another embodiment, the present invention is an object recognition system that includes: a barcode reader comprising: a housing having a window; a first image acquisition assembly positioned at least partially within the housing, the first image acquisition assembly having an IR illumination assembly and a first imager assembly, the first imager assembly having a first FOV and being configured to capture IR light, the first FOV being directed out of the housing through the window, the IR illumination assembly being configured to emit IR light over at least a portion of the first FOV so as to illuminate targets within the first FOV; and a second image acquisition assembly positioned at least partially within the housing, the second image acquisition assembly having a visible-light illumination assembly and a second imager assembly, the second imager assembly having a second FOV and being configured to capture visible light, the second FOV being directed out of the housing through the window, the visible-light illumination assembly being configured to emit visible light over at least a portion of the second FOV so as to illuminate targets within the second FOV; and a server communicatively coupled to the barcode reader, the server configured to: train a machine-learning object recognition model by analyzing first image data received from the first image acquisition assembly; and generate, via the machine-learning object recognition model, object recognition data in response to receiving second image data from the first image acquisition assembly.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
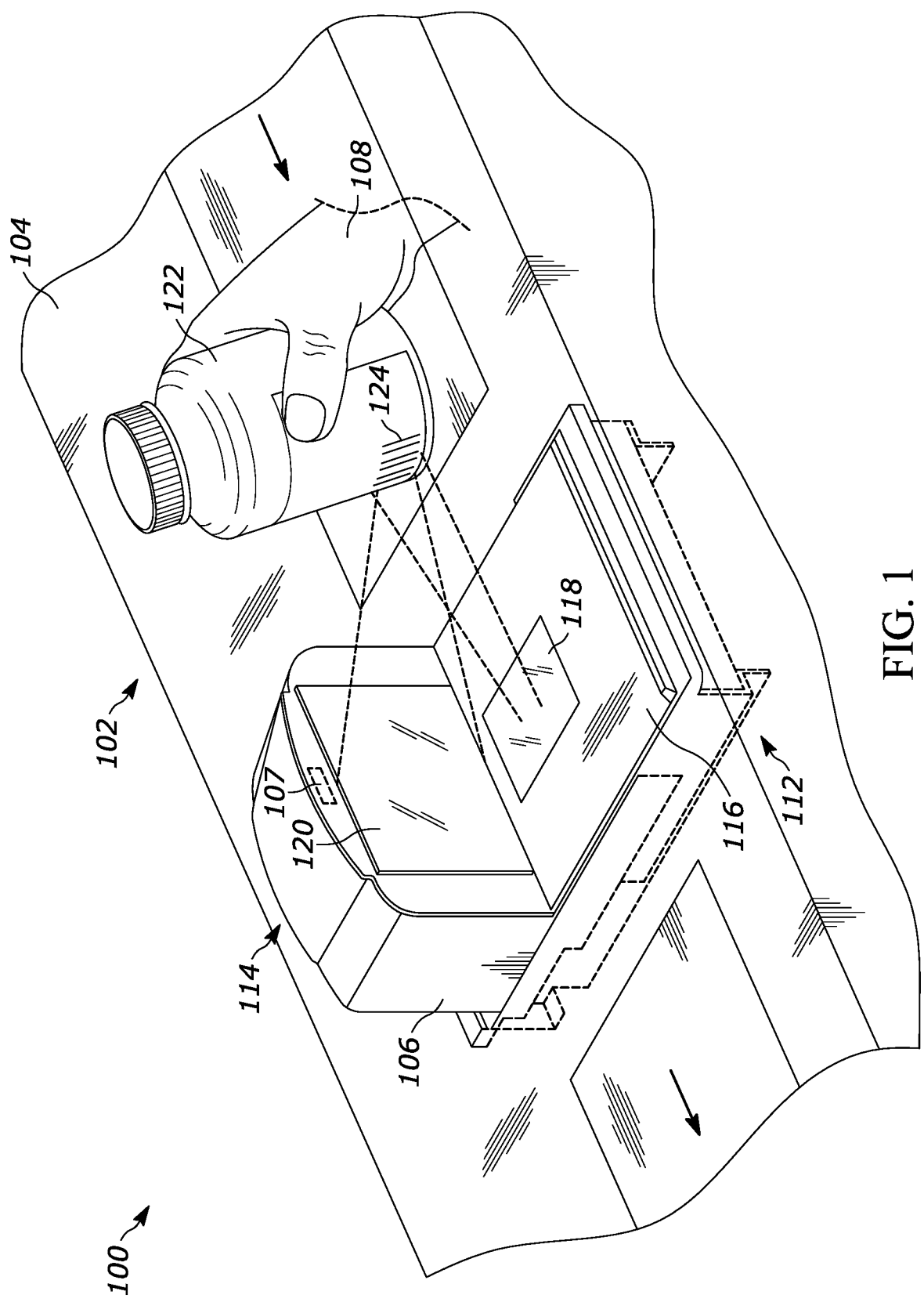
FIG. 1 illustrates a perspective view of a point-of-sale (POS) system having a workstation with a counter, a bi-optical (also referred to as "bi-optic") barcode reader and an additional camera at least partially positioned within a housing of the barcode reader, in accordance with an embodiment of the present application.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As discussed above, in a retail setting, it may be desirable to capture images of products whose barcodes are being read by a barcode reader, e.g., to ensure that the product scanned matches the barcode attached to the product. However, object recognition systems may have difficulty identifying a product against the background of a retail environment. Accordingly, there exists a need for a way to improve upon object recognition difficulties in distinguishing scanned objects from backgrounds in captured images.

One way to reduce the influence of the background is through active illumination, i.e., illumination from the POS system where the object is being scanned. This type of illumination reduces the influence of the background because, generally speaking, the object to be recognized is closer to the POS system than the background is. Active illumination is known to fall off at a rate proportional to the distance squared, while ambient illumination is generally not related to distance. Accordingly, because the object receives more light than the background does, it is easier for an object recognition algorithm to recognize the object (compared to the background) in the image. However, strong illumination may be a nuisance for the person scanning the object (e.g., a retail clerk or a customer using a self-checkout reader). For example, the bright light may shine into the person's eyes when he or she is scanning the object.

In an embodiment, the present invention addresses this problem by illuminating scanned objects with infrared (IR) light when capturing images to be analyzed by object recognition. Because cameras can be made to be sensitive to IR light but humans generally are not, a bright IR light can be used to illuminate a scanned object such that an object recognition algorithm can distinguish the object from the background of a captured image, without bothering the person scanning the object with a bright light.

Furthermore, because IR light is invisible to humans, IR light may be flashed in quick pulses such that the IR light is emitted in sync with the exposure period of the camera, without bothering the person scanning the object with a flashing light. Using this technique, the camera's exposure time may be reduced. Moreover, because the ambient background light is not pulsed, in the shortened illumination window the relative illumination from the ambient may be further reduced, so that the object may be even more easily distinguished from the background of the captured image, i.e., by making the background even darker.

FIG. 1 illustrates a perspective view of a point-of-sale (POS) system 100 having a workstation 102 with a counter 104, a bi-optical (also referred to as "bi-optic") barcode reader 106 (that may be used in the object recognition systems and methods described herein), and an additional camera 107 at least partially positioned within a housing of the barcode reader 106. The camera 107 may be referred to as an image acquisition assembly and may be implemented as a color camera or a camera that is configured to obtain non-barcode data. The POS system 100 is often managed by a store employee such as a clerk 108. However, in other cases the POS system 100 may be a part of a so-called self-checkout lane where instead of a clerk, a customer is responsible for checking out his or her own products.

The barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some embodiments, the top portion 116 may include a removable or a non-removable platter (e.g., a weighing platter). The top portion 116 can also be viewed as being positioned substantially parallel with the counter 104 surface. As set forth herein, the phrase "substantially parallel" means +/−30° of parallel and/or accounts for manufacturing tolerances. It's worth noting that while, in FIG. 1, the counter 104 and the top portion 116 are illustrated as being about co-planar, that does not have to be the case for the platter and the counter 104 to be considered substantially parallel. In some instances, the counter 104 may be raised or lowered relative to the top surface of the top portion 116, where the top portion 116 is still viewed as being positioned substantially parallel with the counter 104 surface. The raised housing 114 is configured to extend above the top portion 116 and includes a second optically transmissive window 120 positioned in a generally upright plane relative to the top portion 116 and/or the first optically transmissive window 118. Note that references to "upright" include, but are not limited to, vertical. Thus, as an example, something that is upright may deviate from a vertical axis/plane by as much as 30°.

In practice, a product 122, such as for example a bottle, is swiped past the barcode reader 106 such that a barcode 124 associated with the product 122 is digitally read through at least one of the first and second optically transmissive windows 118, 120. This is particularly done by positioning the product 122 within the fields of view FOV of the digital imaging sensor(s) housed inside the barcode reader 106. Additionally, as the product 122 is swiped past the barcode reader 106, the camera 107 obtains image data of the product 122. The image data obtained by the camera 107 may have different uses. For example, the image data can be processed to verify that the product 122 scanned matches the barcode 124 and/or image data can be used to populate a database.

Figure 2:
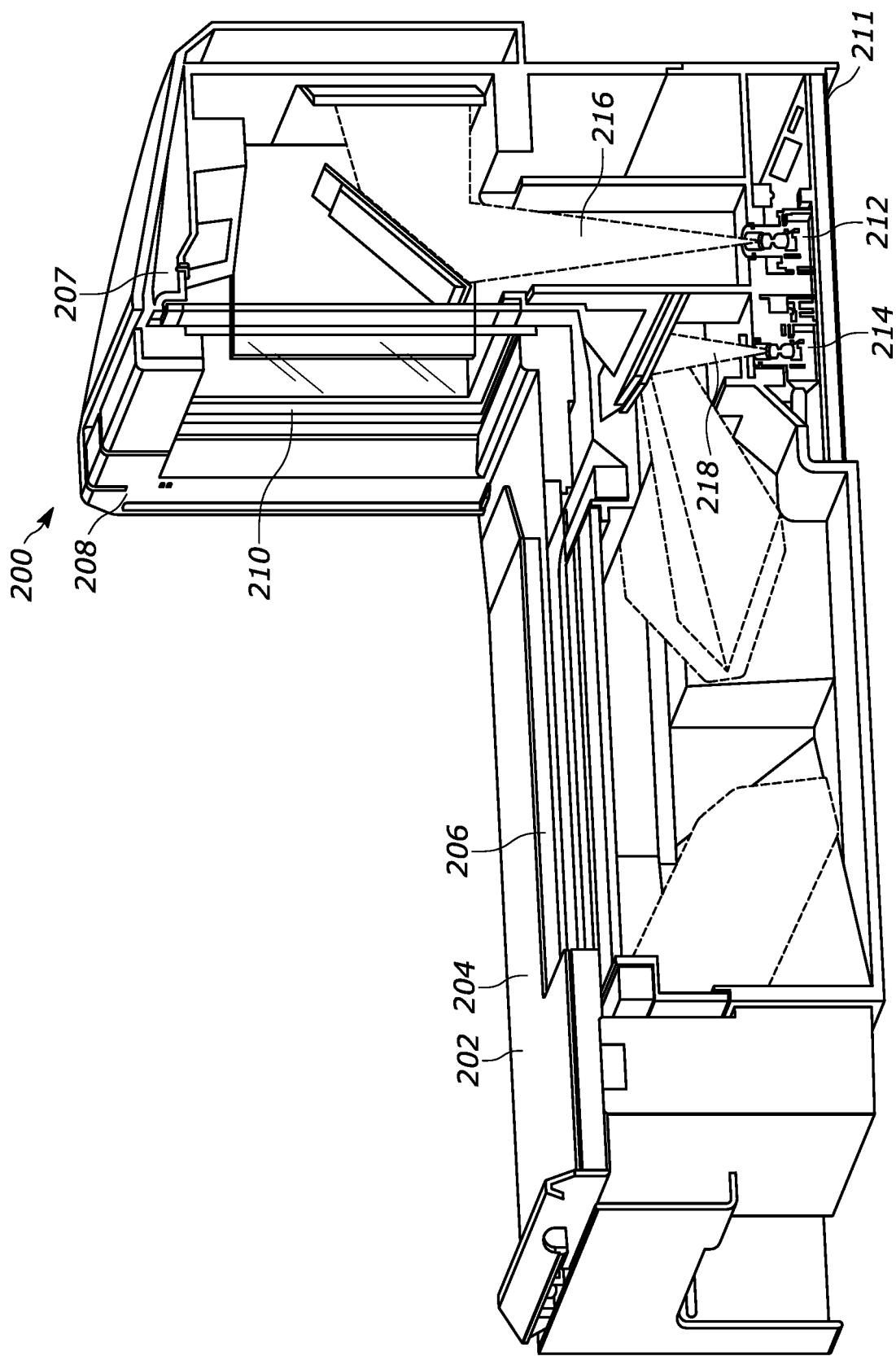
FIG. 2 illustrates a cross-sectional perspective view of an example bi-optic barcode reader that can be used to implement the barcode reader of FIG. 1, in accordance with an embodiment of the present application.

FIG. 2 illustrates a cross-sectional perspective view of an example bi-optic barcode reader 200 that can be used to implement the barcode reader 106 of FIG. 1, in accordance with embodiments of the present application. As shown, the barcode reader 200 includes an example first housing portion 202 that supports a generally horizontal platter 204 having a first window 206. The first window 206 may be implemented as an optically transmissive window and may be referred to as a generally horizontal window. The barcode reader 200 is also shown including an example second housing portion 208 that supports a second window 210. The second housing portion 208 may be referred to as a tower and the second window 210 may be referred to as a generally vertical window. The second window 210 may be implemented as an optically transmissive window. As shown, the first window 206 is substantially perpendicular relative to the second window 210. As set forth herein, the phrase "substantially perpendicular" means +/−30° of perpendicular and/or accounts for manufacturing tolerances.

To enable imaging data to be obtained by the barcode reader 200, the barcode reader 200 includes a printed circuit board (PCB) 211 with a first imaging assembly 212 and a second imaging assembly 214. The imaging assemblies 212, 214 may be referred to as cameras or imager assemblies. Each of the imaging assemblies 212, 214 includes an imaging sensor having a plurality of photosensitive elements that define a substantially flat surface along with other components such as a housing and lens(es) for capturing image data for a FOV. The arrangement and configuration of the components including the imaging sensor, the photosensitive elements, the housing, the lens(es) define a specific FOV for each of the imaging assemblies 212, 214. As shown, the first imaging assembly 212 is configured to capture image data over a first FOV 216 and the second imaging assembly 214 is configured to capture image data over a second FOV 218. The image data captured by the first and second imaging assemblies 212, 214 may include image data representative of an environment in which a barcode or target may appear.

In particular, the first imaging assembly 212 may include a camera sensitive to IR light, while the second imaging assembly 214 may include a camera sensitive to visible light. Furthermore, the first imaging assembly 212 may include one or more IR light sources, while the second imaging assembly 214 may include one or more visible light sources. The IR light sources of the first imaging assembly 212 may be configured to emit IR light during an exposure period of the camera sensitive to IR light of the first imaging assembly 212, while the visible light sources of the second imaging assembly 214 may be configured to emit visible light during an exposure period of the camera sensitive to visible light. Furthermore, the IR-sensitive camera of the first imaging assembly 212 and the visible-light-sensitive camera of the second imaging assembly 214 may be configured to operate with timing such that their exposure periods do not overlap with one another.

Figure 3:
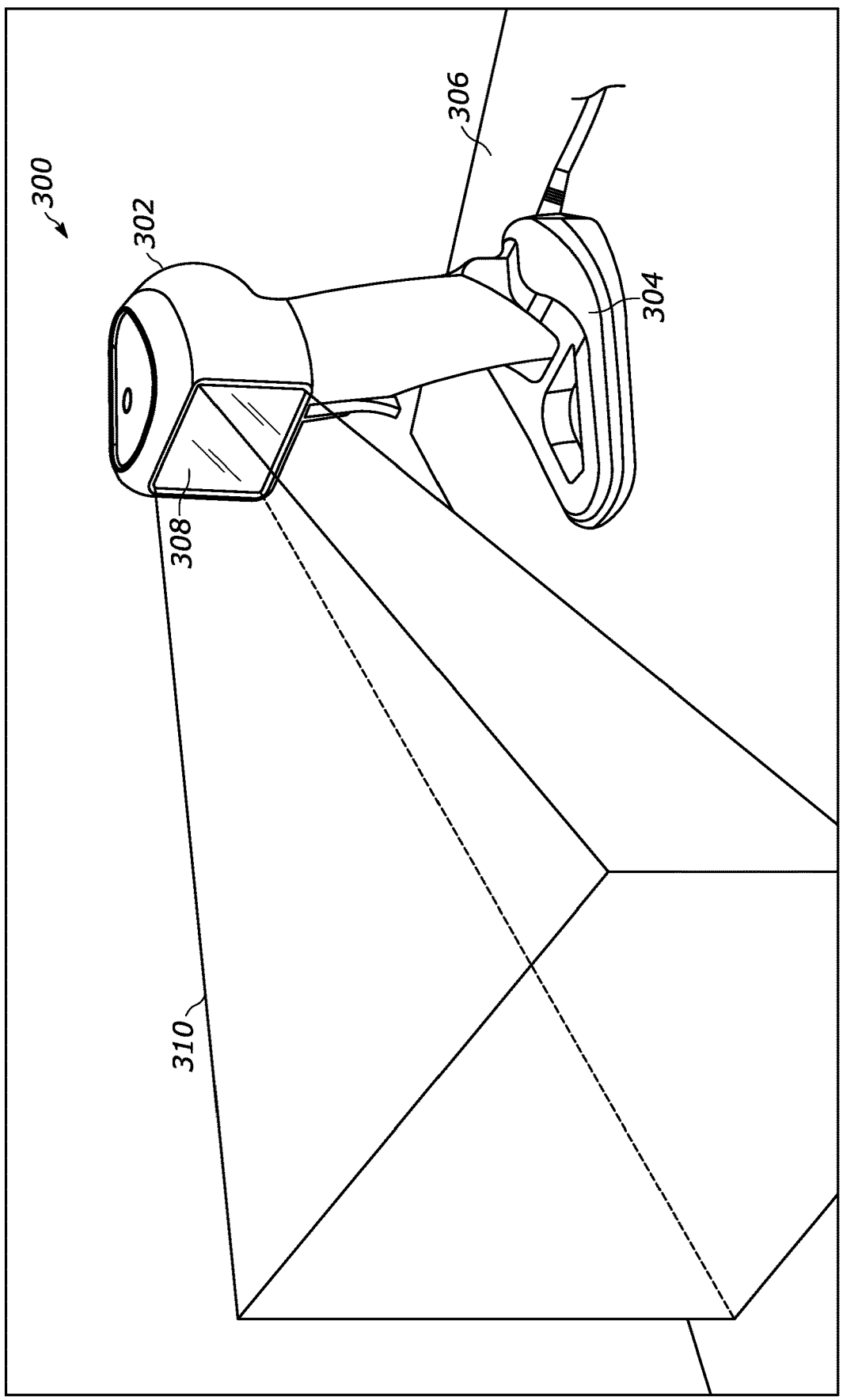
FIG. 3 illustrates an exemplary handheld or presentation barcode reader that may be used in the object recognition systems and methods described herein, in accordance with an embodiment of the present application.

FIG. 3 illustrates an exemplary handheld or presentation barcode reader 300 that may be used in the object recognition systems and methods described herein. The handheld or presentation barcode reader 300 may include a handheld reader 302 and a stationary cradle 304 mounted to a workstation surface 306. The handheld reader 302 rests in the stationary cradle to establish a hands-free scanning mode, also termed a presentation mode, for scanning objects. The handheld reader 302 therefore operates as an imaging reader, with a scanning window 308 in the housing of the handheld reader 302, behind which may be, e.g., first and second image acquisition assemblies (not shown) as described in greater detail with respect to FIG. 4. In the hands-free scanning mode, the handheld reader 302 defines a horizontally and vertically extending FOV 310. In accordance with the techniques herein, the handheld reader 302 captures images of an object for identification and imaging within the FOV 310. A trigger 308 may be used to initiate a hands-free scanning mode, in some examples. In some examples, the hands-free scanning made is initiated by placement of the reader 302 into the cradle 304.

Figure 4:
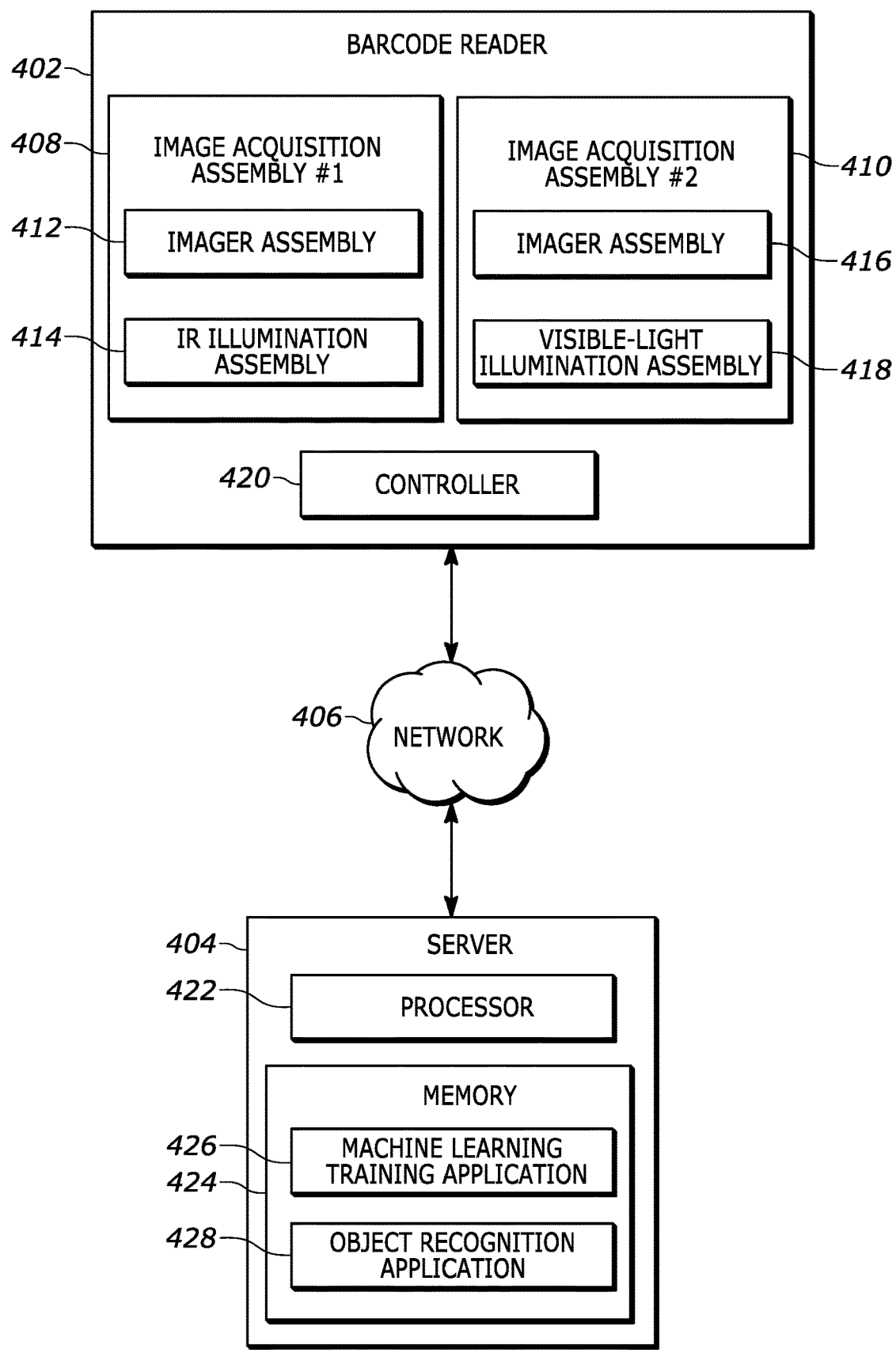
FIG. 4 illustrates a block diagram of an exemplary object recognition system, in accordance with an embodiment of the present application.

In FIG. 4, a block diagram of an exemplary object recognition system 400 is illustrated, in accordance with some embodiments. As shown in FIG. 4, a barcode reader 402 is configured to communicate with a server 404, e.g., via a wired connection or via a wireless network 406. Generally speaking, the barcode reader 402 may be a bi-optic barcode reader (e.g., as shown in FIG. 1 and FIG. 2), a handheld or presentation barcode reader (e.g., as shown in FIG. 3), or any other suitable type of barcode reader. In examples in which the barcode reader 402 is a bi-optic barcode reader, the barcode reader may include a housing (not shown) with a platter and an upright tower. For instance, the platter may have a generally horizontal window while the upright tower has a generally upright window, e.g., as shown in FIG. 1 and FIG. 2. In examples in which the barcode reader 402 is a handheld or presentation barcode reader, the barcode reader may include a housing with one window, e.g., as shown in FIG. 3.

In any case, the barcode reader 402 may include a first image acquisition assembly 408 and a second image acquisition assembly 410, both positioned at least partially within the housing. The first image acquisition assembly 408 may include an imager assembly 412 and an IR illumination assembly 414. In some examples, the imager assembly 412 may be a monochrome imager assembly. Moreover, in some instances, the imager assembly 412 may include a camera without an IR-cut filter, or with the IR-cut filter disabled.

The imager assembly 412 may be configured to capture IR light, and the IR illumination assembly 414 may be configured to emit IR light over a portion of the FOV of the imager assembly 412 so as to illuminate targets within the FOV. For instance, in examples in which the barcode reader 402 is a bi-optic barcode reader, the FOV of the imager assembly 412 may be directed through the generally upright window of the housing. In examples in which the barcode reader 402 is a handheld or presentation barcode reader, the FOV of the imager assembly may be directed through the one window of the housing. Accordingly, the imager assembly 412 may capture images of targets within the FOV of the imager assembly 412 that are illuminated with IR light. For instance, these targets may include objects, such as produce, being scanned by a POS system.

The second image acquisition assembly 410 may include an imager assembly 416 and a visible-light illumination assembly 418. In some examples, the imager assembly 412 may be a multi-colored imager assembly. The imager assembly 416 may be configured to capture visible light, and the visible-light illumination assembly 418 may be configured to emit visible light over a portion of the FOV of the imager assembly 416 so as to illuminate targets within the FOV. For instance, in examples in which the barcode reader 402 is a bi-optic barcode reader, the FOV of the imager assembly 416 may be directed through the generally horizontal window of the housing. In examples in which the barcode reader 402 is a handheld or presentation barcode reader, the FOV of the imager assembly 416 may be directed through the one window of the housing. In some examples, the FOV of the imager assembly 412 and the FOV of the imager assembly 416 may at least partially intersect. For instance, in examples in which the barcode reader 402 is a bi-optic barcode reader, the FOV of the imager assembly 412 and the FOV of the imager assembly 416 may intersect or overlap in a target-scanning region above the platter and in front of the upright tower.

Accordingly, the imager assembly 416 may capture images of targets within the FOV of the imager assembly 416 that are illuminated with visible light. For instance, these targets may include barcodes attached to objects, such as produce, that are being scanned by a POS system.

In some examples, the barcode reader 402 may include a controller 420 communicatively coupled to the first image acquisition assembly 408 and the second image acquisition assembly 410. The controller 420 may be configured to cause the IR illumination assembly 414 and the visible-light illumination assembly 418 to alternatively activate. For instance, the controller 420 may first cause the IR illumination assembly 414 to first illuminate the targets in the FOV of the imager assembly 412, then cease to illuminate the targets in the FOV of the imager 412, then cause the visible-light illumination assembly 418 to illuminate targets in the FOV of the imager assembly 416, then cease to illuminate the targets in the FOV of the imager assembly 416, and so on, alternating between the IR illumination assembly 414 and the visible light illumination assembly 418.

The server 404 may include one or more general-purpose (e.g., microcontrollers and/or microprocessors) or special-purpose processors 422 and a memory 424. The memory 424 may be a non-transitory memory and can include one or several suitable memory modules, such as random access memory (RAM), read-only memory (ROM), flash memory, other types of persistent memory, etc. The memory 424 may include, e.g., a machine learning model training application 426 and an object recognition application 428. The machine learning model training application 426 may be configured to train a machine-learning object recognition model by analyzing image data received from the image acquisition assembly 408 and, and the object recognition application 428 may be configured to generate, object recognition data using the machine-learning object recognition model, e.g., in response to receiving image data from the image acquisition assembly 408.

Figure 5:
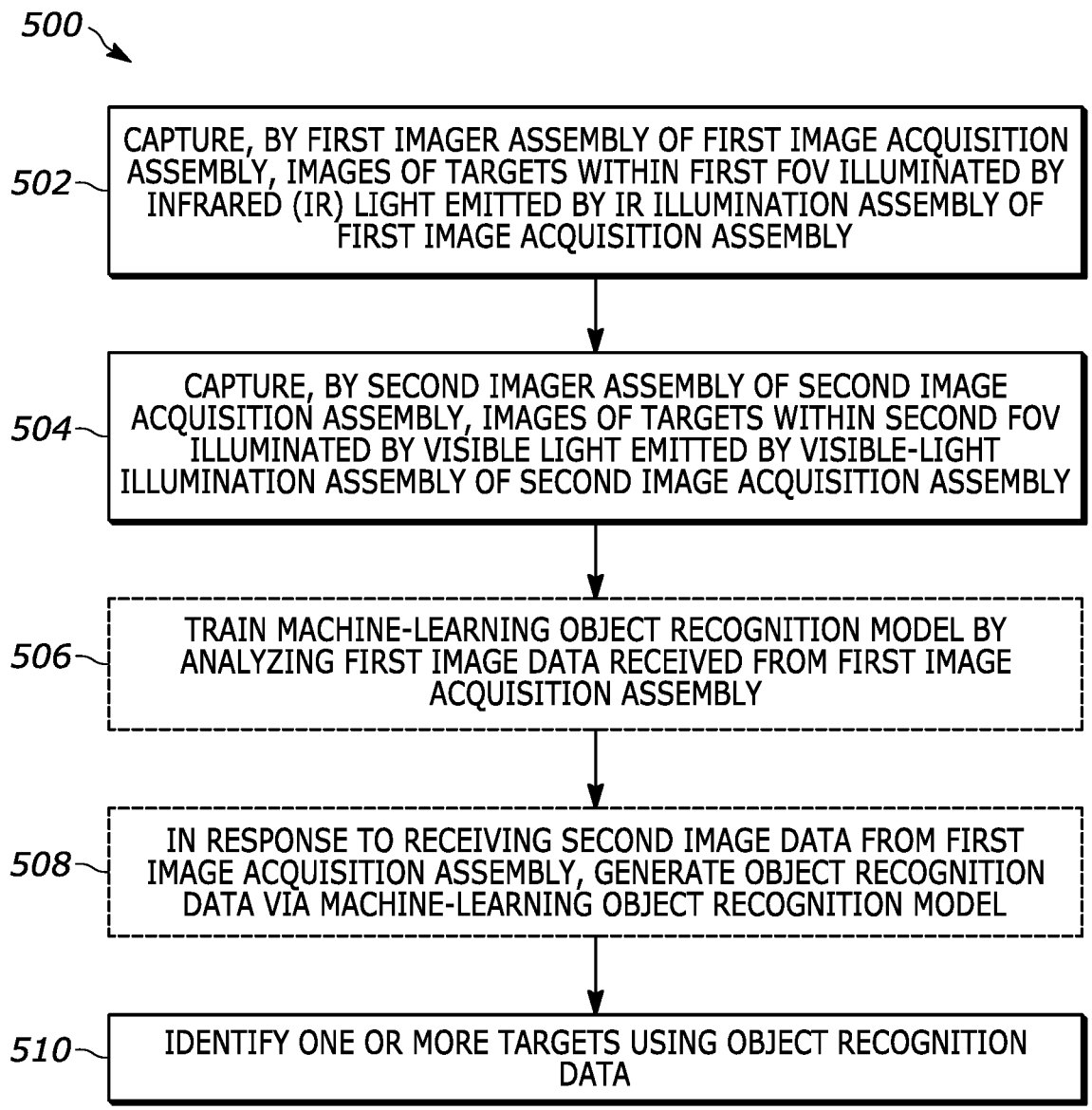
FIG. 5 illustrates a flow diagram of an exemplary computer-implemented object recognition method, in accordance with an embodiment of the present application.

FIG. 5 is a flow diagram of an exemplary computer-implemented object recognition method 500 is illustrated, in accordance with some embodiments. One or more steps of the method 500 may be implemented as a set of instructions stored on a computer-readable memory and executable on one or more processors.

A first imager assembly of a first image acquisition assembly may capture (block 502) images of targets within a first FOV illuminated by IR light emitted by an IR illumination assembly of the first image acquisition assembly. For example, the targets may include objects such as produce being scanned, e.g., by a retail clerk. In some examples, the first imager assembly may include a monochrome imager. In examples involving a bi-optic barcode reader (e.g., as shown in FIG. 1 and FIG. 2), the first FOV may be directed out of a housing through a generally upright window.

A second imager assembly of a second image acquisition assembly may capture (block 504) images of targets within a second FOV illuminated by visible light emitted by a visible-light illumination assembly of the second image acquisition assembly. For example, the targets may include barcodes attached to the objects being scanned. In some examples, the second imager assembly may include a multi-colored imager. In examples involving a bi-optic barcode reader (e.g., as shown in FIGS. 1-2), the second FOV may be directed out of a housing through a generally horizontal window. In examples involving a handheld or presentation barcode reader (e.g., as shown in FIG. 3), the first FOV and the second FOV may both be directed out of a housing through the same window. In some examples, the first FOV and the second FOV at least partially overlap or intersect, e.g., in a target-scanning region. In examples involving a bi-optic reader (e.g., as shown in FIG. 1 and FIG. 2), the target-scanning region may be above the platter and in front of the upright tower.

In some examples, the method may include instructing the IR illumination assembly and the visible-light illumination assembly to alternatively activate, e.g., by a controller communicatively coupled to the first image acquisition assembly and the second image acquisition assembly. For example, the IR illumination assembly may first illuminate the targets in the first FOV, then cease to illuminate the targets in the first FOV, then the visible-light illumination assembly may illuminate targets in the second FOV, then cease to illuminate the targets in the second FOV, and so on, alternating between the IR illumination assembly and the visible light illumination assembly.

In some examples, a machine learning object recognition model may be trained (block 506) by analyzing first image data from the first image acquisition assembly. For instance, the first image data may include images of various objects captured by the first imager assembly from various angles, e.g., an image of a banana illuminated by IR light captured by the first imager assembly from various angles, an image of an apple illuminated by IR light captured by the first imager assembly from various angles, etc. The machine learning object recognition model may be trained using the image data for various types of objects illuminated by IR light and data identifying the type of object shown in each image. Generally speaking, the machine learning model may be trained using supervised learning, unsupervised learning, reinforcement learning, or any other suitable machine learning technique. Over time, as the machine learning object recognition model is trained, the machine learning model can learn to identify targets pictured in images captured by the first imager assembly.

Accordingly, in some examples, object recognition data may be generated (block 508) in response to receiving second image data from first image acquisition assembly, and one or more targets may be identified (block 510) using the object recognition data. For instance, the trained machine learning object recognition model may be used to identify a banana illuminated by IR light as shown in an image captured by the first imager assembly. In some examples, the first image data may be separate from the second image data. For instance, the first image data may be specifically designated historical training data while the second image data includes new images captured by the first imager assembly. However, in other examples, the machine learning object recognition model may be continuously trained as new images are captured by the first imager assembly, so the first image data used for training may include the second image data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An object recognition system comprising:
 a bi-optic barcode reader comprising:
  a housing having a platter and an upright tower, the platter having a generally horizontal window and the upright tower having a generally upright window;
  a first image acquisition assembly positioned at least partially within the housing, the first image acquisition assembly having an infrared (IR) illumination assembly and a first imager assembly, the first imager assembly having a first field of view (FOV) and being configured to capture IR light, the first FOV being directed out of the housing through the generally upright window, the IR illumination assembly being configured to emit IR light over at least a portion of the first FOV so as to illuminate targets within the first FOV; and
  a second image acquisition assembly positioned at least partially within the housing, the second image acquisition assembly having a visible-light illumination assembly and a second imager assembly, the second imager assembly having a second FOV and being configured to capture visible light, the second FOV being directed out of the housing through the generally horizontal window, the visible-light illumination assembly being configured to emit visible light over at least a portion of the second FOV so as to illuminate targets within the second FOV; and
 a server communicatively coupled to the bi-optic barcode reader, the server configured to:
  train a machine-learning object recognition model by analyzing first image data received from the first image acquisition assembly; and
  generate, via the machine-learning object recognition model, object recognition data in response to receiving second image data from the first image acquisition assembly.

2. The object recognition system of claim 1, wherein the first image data and the second image data at least partially overlap.

3. The object recognition system of claim 1, wherein the bi-optic barcode reader further comprises:
a controller communicatively coupled to the first image acquisition assembly and the second image acquisition assembly, the controller having instructions programmed therein which, when executed, cause the controller to instruct the IR illumination assembly and the visible-light illumination assembly to alternatively activate.

4. The object-recognition system of claim 1, wherein the first FOV and the second FOV at least partially intersect in a target-scanning region above the platter and in front of the upright tower.

5. The object-recognition system of claim 1, wherein the first imager assembly includes a monochrome imager, and wherein the second imager assembly includes a multi-colored imager.

6. A method, comprising:
capturing, by a first imager assembly of a first image acquisition assembly positioned at least partially within a housing having a platter and an upright tower, the platter having a generally horizontal window and the upright tower having a generally upright window, images of targets within a first FOV illuminated by infrared (IR) light emitted by an IR illumination assembly of the first image acquisition assembly, wherein the first FOV is directed out of the housing through the generally upright window;
capturing, by a second imager assembly of a second image acquisition assembly positioned at least partially within the housing, images of targets within a second FOV illuminated by visible light emitted by a visible-light illumination assembly of the second image acquisition assembly, wherein the second FOV is directed out of the housing through the generally horizontal window;
training, by a server communicatively coupled to the bi-optic barcode reader, a machine-learning object recognition model by analyzing first image data received from the first image acquisition assembly; and
generating, by the server, via the machine-learning object recognition model, object recognition data in response to receiving second image data from the first image acquisition assembly.

7. The method of claim 6, further comprising:
instructing, by a controller communicatively coupled to the first image acquisition assembly and the second image acquisition assembly, the IR illumination assembly and the visible-light illumination assembly to alternatively activate.

8. The method of claim 6, wherein the first FOV and the second FOV at least partially intersect in a target-scanning region above the platter and in front of the upright tower.

9. The method of claim 6, wherein the first imager assembly includes a monochrome imager, and wherein the second imager assembly includes a multi-colored imager.

10. A method, comprising:
capturing, by a first imager assembly of a first image acquisition assembly positioned at least partially within a housing having a window, images of targets within a first FOV illuminated by infrared (IR) light emitted by an IR illumination assembly of the first image acquisition assembly, wherein the first FOV is directed out of the housing through the window;
capturing, by a second imager assembly of a second image acquisition assembly positioned at least partially within the housing, images of targets within a second FOV illuminated by visible light emitted by a visible-light illumination assembly of the second image acquisition assembly, wherein the second FOV is directed out of the housing through the window;
training, by a server communicatively coupled to the barcode reader, a machine-learning object recognition model by analyzing first image data received from the first image acquisition assembly; and
generating, by the server, via the machine-learning object recognition model, object recognition data in response to receiving second image data from the first image acquisition assembly.

11. The method of claim 10, further comprising:
instructing, by a controller communicatively coupled to the first image acquisition assembly and the second image acquisition assembly, the IR illumination assembly and the visible-light illumination assembly to alternatively activate.

12. The method of claim 10, wherein the first FOV and the second FOV at least partially intersect in a target-scanning region.

13. The method of claim 10, wherein the first imager assembly includes a monochrome imager, and wherein the second imager assembly includes a multi-colored imager.

14. An object recognition system comprising:
a barcode reader comprising:
a housing having a window;
a first image acquisition assembly positioned at least partially within the housing, the first image acquisition assembly having an infrared (IR) illumination assembly and a first imager assembly, the first imager assembly having a first field of view (FOV) and being configured to capture IR light, the first FOV being directed out of the housing through the window, the IR illumination assembly being configured to emit IR light over at least a portion of the first FOV so as to illuminate targets within the first FOV; and
a second image acquisition assembly positioned at least partially within the housing, the second image acquisition assembly having a visible-light illumination assembly and a second imager assembly, the second imager assembly having a second FOV and being configured to capture visible light, the second FOV being directed out of the housing through the window, the visible-light illumination assembly being configured to emit visible light over at least a portion of the second FOV so as to illuminate targets within the second FOV; and a server communicatively coupled to the barcode reader, the server configured to:
train a machine-learning object recognition model by analyzing first image data received from the first image acquisition assembly; and
generate, via the machine-learning object recognition model, object recognition data in response to receiving second image data from the first image acquisition assembly.

15. The object recognition system of claim 14, wherein the first image data and the second image data at least partially overlap.

16. The object recognition system of claim 14, wherein the barcode reader further comprises:

a controller communicatively coupled to the first image acquisition assembly and the second image acquisition assembly, the controller having instructions programmed therein which, when executed, cause the controller to instruct the IR illumination assembly and the visible-light illumination assembly to alternatively activate.

17. The object-recognition system of claim 14, wherein the first FOV and the second FOV at least partially intersect in a target-scanning region.

18. The object-recognition system of claim 14, wherein the first imager assembly includes a monochrome imager, and wherein the second imager assembly includes a multi-colored imager.

* * * * *